United States Patent
Hull

(10) Patent No.: US 11,718,030 B2
(45) Date of Patent: Aug. 8, 2023

(54) SPATIAL LIGHT MODULATION OF POWDER-BASED ADDITIVE MANUFACTURING WITH TEMPERATURE CONTROL INCLUDING BY SENSOR FEEDBACK

(71) Applicant: 3D Systems, Inc., Rock Hill, SC (US)

(72) Inventor: Charles W. Hull, Santa Clarita, CA (US)

(73) Assignee: 3D SYSTEMS, INC, Rockhill, SC (US)

(*) Notice: Subject to any disclaimer, the term of this patent is extended or adjusted under 35 U.S.C. 154(b) by 443 days.

(21) Appl. No.: 15/845,027

(22) Filed: Dec. 18, 2017

(65) Prior Publication Data

US 2018/0186074 A1 Jul. 5, 2018

Related U.S. Application Data

(60) Provisional application No. 62/440,077, filed on Dec. 29, 2016.

(51) Int. Cl.
*B29C 64/277* (2017.01)
*B29C 64/153* (2017.01)
(Continued)

(52) U.S. Cl.
CPC ............ *B29C 64/277* (2017.08); *B22F 10/28* (2021.01); *B22F 10/362* (2021.01); *B22F 12/13* (2021.01);
(Continued)

(58) Field of Classification Search
CPC ... B29C 64/277; B29C 64/268; B29C 64/393; B29C 64/153; B33Y 10/00; B33Y 30/00;
(Continued)

(56) References Cited

U.S. PATENT DOCUMENTS 5,639,402 A * 6/1997 Barlow ..................... A61F 2/28
264/6
6,780,368 B2 * 8/2004 Liu ..................... G05B 19/4099
264/494

(Continued)

FOREIGN PATENT DOCUMENTS

EP 1466718 10/2004
EP 1648686 A1 * 4/2006 ........... B29C 64/153
(Continued)

OTHER PUBLICATIONS

WO-2011082812-A1 translation (Year: 2022).*
(Continued)

*Primary Examiner* — Xiao S Zhao
*Assistant Examiner* — Guy F Mongelli

(57) ABSTRACT

Methods and apparatus are provided for controlling the temperature of powders in a powder-based additive manufacturing system using spatial light modulation. Powder layer temperatures can be measured and selectively controlled using a radiation source comprising a spatial light modulator. The spatial light modulator applies a visible light radiation and/or IR radiation. In addition to controlling the pre-fused temperature of the powder in the image plane, the spatial light modulator can also apply the radiation to fuse the powder.

12 Claims, 1 Drawing Sheet

(51) Int. Cl.
| | |
|---|---|
| *B29C 64/393* | (2017.01) |
| *B29C 64/268* | (2017.01) |
| *B33Y 30/00* | (2015.01) |
| *B33Y 10/00* | (2015.01) |
| *B22F 12/00* | (2021.01) |
| *B22F 10/10* | (2021.01) |
| *B22F 10/28* | (2021.01) |
| *B22F 12/13* | (2021.01) |
| *B22F 12/17* | (2021.01) |
| *B22F 12/41* | (2021.01) |
| *B22F 12/90* | (2021.01) |
| *B22F 10/362* | (2021.01) |
| *B22F 10/77* | (2021.01) |
| *B22F 12/42* | (2021.01) |
| *B22F 12/63* | (2021.01) |
| *B22F 12/67* | (2021.01) |

(52) U.S. Cl.
CPC ............ *B22F 12/17* (2021.01); *B22F 12/41* (2021.01); *B22F 12/90* (2021.01); *B29C 64/153* (2017.08); *B29C 64/268* (2017.08); *B29C 64/393* (2017.08); *B33Y 10/00* (2014.12); *B33Y 30/00* (2014.12); *B22F 10/10* (2021.01); *B22F 10/77* (2021.01); *B22F 12/42* (2021.01); *B22F 12/63* (2021.01); *B22F 12/67* (2021.01); *B22F 2999/00* (2013.01); *G01N 2203/0641* (2013.01); *G01N 2203/0652* (2013.01); *G05B 2219/37573* (2013.01); *G05B 2219/49023* (2013.01); *Y02P 10/25* (2015.11)

(58) Field of Classification Search
CPC ............ B22F 3/1055; B22F 2003/1056; B22F 2999/00; G05B 2219/49023; G05B 2219/37573; Y02P 10/295; G01N 2203/0652; G01N 2203/0641
See application file for complete search history.

(56) References Cited

U.S. PATENT DOCUMENTS

| | | | |
|---|---|---|---|
| 2004/0120577 A1* | 6/2004 | Touzov | G02B 27/46 359/290 |
| 2009/0206522 A1 | 8/2009 | Hein et al. | |
| 2013/0101803 A1 | 4/2013 | Grebe et al. | |
| 2014/0363184 A1* | 12/2014 | Santo | G03G 9/0821 399/68 |
| 2015/0308741 A1* | 10/2015 | Chen | B29C 64/295 34/553 |
| 2015/0336219 A1* | 11/2015 | Bruck | B23K 35/3605 428/570 |
| 2015/0367415 A1* | 12/2015 | Buller | B23K 26/123 419/53 |
| 2016/0184480 A1* | 6/2016 | Cox | B33Y 70/00 424/423 |
| 2016/0281224 A1* | 9/2016 | Harada | C23C 16/455 |
| 2016/0306266 A1* | 10/2016 | Hou | B29C 64/393 |
| 2016/0322667 A1* | 11/2016 | Maeda | H01M 4/386 |
| 2016/0375638 A1* | 12/2016 | Kabili | B33Y 10/00 264/492 |
| 2016/0379851 A1* | 12/2016 | Swaminathan | H01L 21/67115 438/715 |
| 2017/0304944 A1* | 10/2017 | Symeonidis | B23K 15/02 |
| 2018/0169946 A1* | 6/2018 | Paternoster | B29C 64/268 |
| 2019/0202112 A1* | 7/2019 | Gmeiner | B29C 64/236 |

FOREIGN PATENT DOCUMENTS

| | | | |
|---|---|---|---|
| EP | 1648868 | 4/2006 | |
| EP | 2913124 A2 * | 9/2015 | ............ B22F 3/1055 |
| FR | 2984778 A1 * | 6/2013 | ............ B22F 3/1055 |
| WO | WO-2011082812 A1 * | 7/2011 | ............ B22F 3/1055 |
| WO | 2016048348 | 3/2016 | |

OTHER PUBLICATIONS

EP-2913124-A2 translation (Year: 2022).*
PCT International Search Report for International Application No. PCT/US2017/066958, dated Apr. 6, 2018 (6 pages).
PCT International Written Opinion for International Application No. CT/US2017/066958, dated Apr. 6, 2018 (8 pages).

* cited by examiner

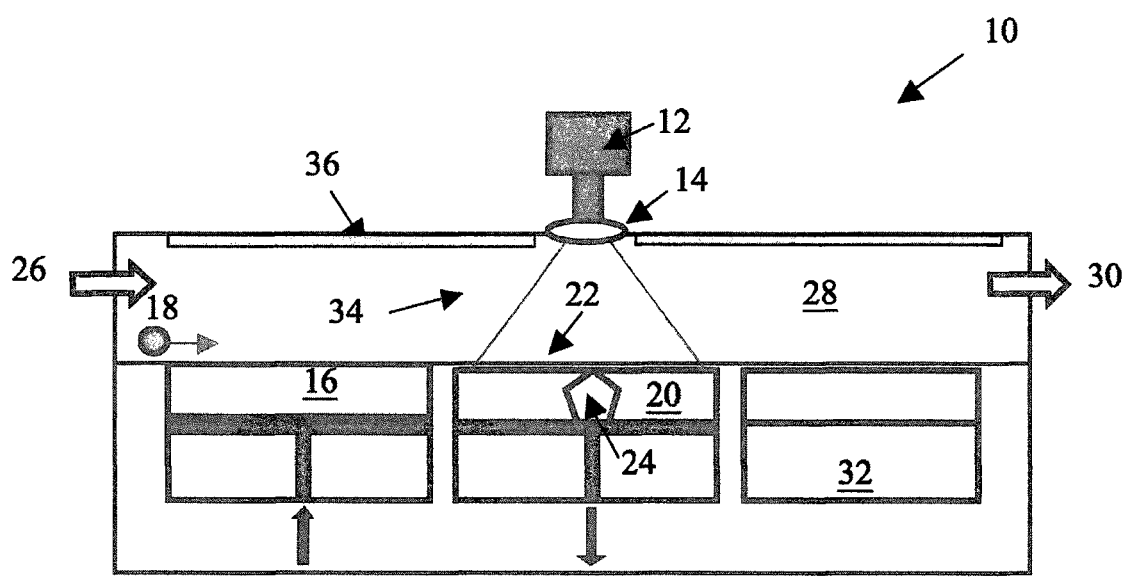

SPATIAL LIGHT MODULATION OF POWDER-BASED ADDITIVE MANUFACTURING WITH TEMPERATURE CONTROL INCLUDING BY SENSOR FEEDBACK

CROSS REFERENCE TO RELATED APPLICATIONS

This non-provisional patent application claims priority to U.S. Provisional Application Ser. No. 62/440,077, Entitled "POWDER-BASED ADDITIVE MANUFACTURING TEMPERATURE CONTROL BY SPATIAL LIGHT MODULATION" by Charles W. Hull, filed on Dec. 29, 2016, incorporated herein by reference under the benefit of U.S.C. 119(e).

FIELD OF THE INVENTION

The present invention is related to powder-based additive manufacturing technologies, and more particularly, to temperature control within additive manufacturing systems using spatial light modulation devices.

BACKGROUND

Review Additive manufacturing systems can be used to produce three dimensional (3D) objects from computer aided design (CAD) models or other models representing such objects. Certain additive manufacturing systems create the 3D objects by selectively sintering, melting, bonding, fusing, or the like (collectively, "fusing" hereafter) the powder materials using an energy source and may include such techniques as selective laser sintering, multi-jet fusion, electron beam melting, high speed sintering. In many of these powder-based additive manufacturing systems, the control of the temperature of the build chamber and/or powder layer is very important to producing 3D objects with the desired mechanical properties, surface finish, and/or dimensional accuracy. Prior art techniques for controlling the temperature of the build chamber and/or powder layer includes the use of radiant heaters, including zoned radiant heaters, that may be controlled based upon temperature measurements taken within the build chamber and/or of the powder layer or portions of the powder layer. However, a need exists for improved temperature control within powder-based additive manufacturing systems.

BRIEF DESCRIPTION OF THE FIGURES

Reference will now be made to the accompanying drawings, which are not necessarily drawn to scale and are meant to be illustrative and not limiting, and wherein:

FIG. 1 is a side view of a schematic representation of a powder-based additive manufacturing system in accordance with one embodiment of the present invention, wherein the radiation source comprising a spatial light modulator is a DLP.

The following is a brief description of the elements referenced in FIG. 1:

10—Powder-based additive manufacturing system.
12—Modulated radiation source including a spatial light modulator, such as a micro-mirror array-based digital light processor (DLP), with sufficient optical power to heat a powder bed surface 22 to at least a predetermined temperature below a fusing temperature of the powder. In the discussion infra, the DLP version of a spatial light modulator will be used as a particular embodiment but it is to be understood that other types of light modulators can be used as part of the modulated radiation source 12. Modulated radiation source 12 also includes a light source that can be spatially and temporally modulated by the spatial light modulator.
14—Transparent window, lens, or a set of transmissive and/or reflective optical components between the DLP and a chamber 28 to isolate the DLP from the higher temperature chamber.
16—Supply of powder. A new layer of powder is made available by pushing the bottom of the supply up to provide one layer of material for recoater 18. In alternative embodiments, the supply may be a hopper or the like positioned above the recoater for depositing powder between the recoater and the powder bed.
18—A recoater, such as a roller or doctor blade, that moves from left to right, moving the fresh powder layer to the powder bed 20. Any slight excess powder is further moved past the build region and deposited in the excess powder container 32.
20—Powder bed or build region. After each printed layer the powder bed elevator moves down one layer thickness, so as to accept fresh powder from the supply 16.
22—Image plane defined along the top layer of the powder bed, to be controlled at a precise temperature by controlling the optical power from the radiation source 12. During formation of a 3D object, layers of powder are selectively solidified at the image plane 22.
24—3D object that is made by exposing successive layers in the powder bed with optical power, within each successive cross-section of the 3D object, sufficient to fuse the powder.
26—Inlet port of heated gas or air for raising the temperature of the gas or air in chamber 28 to a precise higher intermediate temperature above ambient but below the temperature where powder 16 does not readily flow. The purpose is to pre-heat the powder to reduce the optical power required to heat the powder layer to the process temperature or the fusing temperature.
28—Build chamber above the powder beds 16, 20 and 32 that is environmentally controlled and within which the 3D object is produced.
30—Removal port of gas or air, so that the gas or air can be recirculated, reheated, and returned to port 26.
32—Overflow for excess powder collection from which the powder can be manually (between build processes) or automatically recirculated back to the supply of powder 16.
34—Temperature measurement device for measuring the temperature of powder at one or more locations of the image plane.
36—Chamber heaters to heat the build chamber to at or near the precise higher intermediate temperature.

SUMMARY

The various embodiments of the present invention address the above needs and achieve other advantages by providing methods and apparatus for controlling the temperature of the top layer of the powder bed (defining an image plane) with a radiation source comprising a spatial light modulator. The powder-based additive manufacturing systems of various embodiments of the present invention may include a temperature measurement device for measuring a temperature of the powder layer defining the image plane in one or more locations. A controller controls the radiation source comprising the spatial light modulator based upon the measured temperatures relative to predetermined temperatures, such as the process temperature for the respective powder material. The radiation source comprising the spatial light modulator, which in certain embodiments may comprise a digital light projector (DLP), applies radiation that is visible light and/or infrared (IR) radiation or radiation with a wavelength of at least about 400 nanometers (nm). In addition to pre-heating the powder prior to fusing, the radiation source comprising the spatial light modulator may also apply the radiation to selectively fuse the powder layer of the image plane. In alternative embodiments of the present invention, an additional radiation source, such as a laser or other radiation source known in the art, may be used to fuse the powder layer of the image plane.

Further embodiments of the present invention include a heated gas supply that may be provided to the build chamber through an inlet port and out a removal port for reheating and recirculation. Such heated gas may provide gross temperature control for the powder layer defining the image plane while the radiation source comprising the spatial light modulator may provide fine temperature control. In still further embodiments, the build chamber can be directly heated with heaters, such as radiant, on the chamber walls and/or ceiling to additionally or alternatively provide the gross temperature control. Various embodiments of the present invention include other components and methods, such as the use of a recoater to apply fresh powder to the part bed to define subsequent powder layers for selective fusing, the use of an excess powder collector (overflow), and/or the use of a temperature measurement device, such as a zoned temperature measurement device to provide closed loop control of the image plane temperatures.

Still further embodiments comprise alternative and/or additional components and methods in order to provide improved temperature control, and resulting quality control, for powder-based additive manufacturing systems.

DETAILED DESCRIPTION OF THE PREFERRED EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for providing radiation with a spatial light modulator are described and shown in the accompanying drawings with regard to specific types of powder-based additive manufacturing systems and radiation sources, it is envisioned that the functionality of the various apparatus and methods may be applied to any now known or hereafter devised additive manufacturing systems in which it is desired to provide accurate temperature control along an image plane. Like numbers refer to like elements throughout.

With reference to FIG. 1, a powder-based additive manufacturing system 10 in accordance with one embodiment of the present invention is illustrated. The radiation source 10 of FIG. 1 is a DLP that comprises a spatial light modulator that radiates visible light and/or IR radiation. The DLP is located outside of the build chamber 28 so that the DLP is not subjected to the elevated temperatures within the build chamber or exposed to the particle build up that sometimes occur within the build chambers of powder-based additive manufacturing systems. The radiation from the radiation source 10 passes through the transparent window 14, which in some embodiments comprises a lens that modifies the trajectory of the radiation, onto the image plane 22 defined along the top powder layer of the powder bed 20.

The powder used to produce the 3D object 24 is provided from the supply 16 of powder, which in the illustrated embodiment is positioned adjacent the powder bed 20 so that powder presented by the supply 16, such as by raising the supply powder a predetermined distance, can be moved from the supply to the powder bed by the recoater 18. The recoater 18 in the illustrated embodiment is a counter-rotating roller, as known in the art; however, further embodiments of the present invention comprise any device for moving powder to the powder bed and forming the powder into flat layer. Any excess powder that is pushed beyond the powder bed may be deposited into overflow 32 from which the powder may be subsequently recirculated back to the supply 16. In some embodiments, the recoater may perform a second (return) pass over the powder bed to increase the powder density of the top layer of powder on the powder bed. In such embodiments, the powder that is pushed beyond the powder bed may be repositioned to be between the roller and the powder bed for the second (return) pass for use when increasing the powder density. In such embodiments, the supply 16 may function as the overflow 32 or the overflow may be provided on the side of the supply opposite the powder bed.

The powder bed 20, also commonly referred to as the build region, comprises a platform upon which the powder is layered and that is lowered an incremental amount along the z-axis to define the layer thickness, as generally known in the powder-based additive manufacturing art. The present invention in certain embodiments comprises a temperature measurement device 34 capable of measuring the temperature of the powder along the image plane (the top layer of powder on the powder bed). The temperature can be measured at either a single location, in some embodiments, or at a plurality of locations, in other embodiments. The temperature measurement device 34 of various embodiments of the present invention comprise IR sensors, IR thermometers, one or more forward looking infrared radiometer (FLIR) cameras, and similar devices. The measured temperatures are sent to the controller and compared to known temperatures for the particular powder materials, or combination of powder materials, being used to make the 3D object in order to control the powder temperatures in real time, in some embodiments. The temperatures of the powder materials of particular interest are (i) the flow temperature, above which the powder will not properly move from the supply 16 to the powder bed 20, which can lead to flaws or irregularities in the powder layer which will directly result in defects in the 3D object; (ii) the process temperature, at which the powder along the image plane should be maintained prior to, during, and after the selective fusing of the powder so that the fused powder will define optimal mechanical properties after the build process and will define optimal part accuracy and texture; and (iii) the fusing temperature, at which the powder particles will fuse to each other in order to comprise the 3D object.

In order to minimize the amount of energy supplied to the powder by the radiation source 12 and thus reduce the build time for the additive manufacturing process, the supply powder in some embodiments is pre-heated to a temperature just below the flow temperature. In the illustrated embodiment of FIG. 1, the supply powder is pre-heated by use of a flow of heated gas or air that travels from inlet port 26 to removal port 30. The flow of heated gas or air also generally keeps the build chamber at a controlled temperature to minimize or prevent thermal distortions within or among the components of the build chamber, which could impair the operation of the additive manufacturing system 10 or reduce the part quality of the 3D object 24. The flow of heated gas or air in some embodiments also prevents fumes generated by the additive manufacturing process from reaching the transparent window 14 in order to minimize the clouding of the transparent window, as such clouding directly reduces the power density of the radiation received at the image plane. The heated gas or air from removal port 30 may be filtered and reheated prior to recirculation back into the build chamber 28 through the inlet port 26, thereby reducing the amount of nitrogen or argon, which are commonly used for powder-based additive manufacturing, needed for the build process. Chamber heaters 36 can also be used and set to maintain the chamber temperature at the flow temperature.

The powder-based additive manufacturing system of various embodiments of the present invention includes a controller to control the motion and radiation of the various components of the system. In such embodiments, the controller includes a processor coupled to a non-transient information storage device. The information storage device stores software instructions that, when executed by the processor, perform various steps that include operating the recoater, radiation source and spatial light modulator, the temperature measurement device, the flow of heated gas and/or other components of the system. The controller can be part of a single integrated circuit (IC) component or distributed across multiple IC components in one location or multiple locations within the additive manufacturing system.

The radiation source 12 comprises a spatial light modulator that projects the radiation in a two dimensional pattern through the transparent window 14 and onto the image plane 22 along the x-axis and y-axis. Each pixel of the spatial light modulator can be controlled, such as with a 0 to 255 scale in some embodiments, to adjust the amount of radiation supplied to each pixel at a certain point in time and/or for a controlled period of time. In various embodiments of the present invention, the power density of the radiation at the image plane may be between 0 and 100 W/cm$^2$. The radiation source may be an LED, an LED array, a near IR fiber laser, a diode laser, or other light sources known in the art for use with spatial light modulators.

The spatial light modulator of certain embodiments of the present invention comprises a digital mirror device (DMD) within a digital light projector (DLP). Other spatial light modulators of various embodiments of the present invention include liquid-crystal display (LCD), liquid crystal on silicone (LCOS), and grating light valve (GLV) devices. SLMs with high optical power capability such as for theater projectors, or GLV, or special purpose DMD are best suited for certain embodiments of the present invention, although lower power SLMs are suitable for powder-based additive manufacturing systems 10 defining relatively smaller build volumes. A high speed raster laser scanner modulated in X, Y and intensity, coupled with a high power laser is also suitable in further embodiments of the present invention.

The temperature measurement device 34 of various embodiments of the present invention may be any temperature measurement device known in the art or hereafter devised. The temperature measurement device 34 of the illustrated embodiment comprises a zoned temperature measurement device (or devices) that can simultaneously (or near simultaneously) measure the powder temperature at a plurality of locations along the image plane. The temperature measurements are sent to the controller and used to control the radiation source 12 (including the SLM) to keep the powder along the image plane at or near a process temperature that in some embodiments is above the temperature at which the powder freely flows and below the fusing temperature at which the powder is selectively fused to produce the 3D object. One illustrative example is Nylon 12 powder, which melts at 184 degrees C. In certain embodiments of the present invention, a reasonable flow temperature is 160 degrees C.; a reasonable process temperature is 174 degrees C.; and a reasonable fusing temperature is 194 degrees C. In practice, these temperatures are determined experimentally to determine the best operating conditions that yield the most accurate 3D object with good mechanical properties.

The supply of powder 16 in various embodiments of the present invention comprises a semi-crystalline polymers, such as polyamide (PA), including PA 12, PA 11, PA 6 or combinations thereof, in powder form. Further embodiments comprise higher temperature materials, such as polyaryletherketone (PAEK), polyetheretherketone (PEEK), and polyphenylene sulfide (PPS) or combinations thereof. Additional powder materials that are typically not used for powder-based additive manufacturing systems, including polycarbonates (PC) may be used with various embodiments of the present invention as a result of the improved ability to measure and control the powder temperatures prior to, and subsequent to, fusing.

Additives to the powder, such as carbon black or other pigments and dyes are used in certain embodiments of the present invention to increase the absorption of radiation in the powder. The appropriate pigment or dye is of the complementary color to the light color of the radiation source; that is, it is the direct opposite in the color spectrum. For example, magenta light is absorbed by green dye; green light is absorbed by magenta dye, etc. Since black absorbs all colors, carbon black is commonly used. Certain plastic powders, such as PA, do not commonly strongly absorb near IR or visible light, so an additive is used with PA in certain embodiments of the present invention. Metal powders do strongly absorb near IR, so an additive is not usually required in embodiments of the present invention that use metal powders in the powder-based additive manufacturing system.

As noted above, in various embodiments of the present invention, the power density of the spatial light modulated radiation at the image plane may be between 0 and 100 W/cm$^2$. Such power density is sufficient to increase the temperature of nylon 12, for example, to the process temperature and to the fusing temperature. As a further illustrative example, in one embodiment of the present invention a DLP applies radiations onto a nylon 12 powder bed over a projection area of 3 by 4 inches (the image plane), with a total power of 100 W, or 1.29 W/cm$^2$. A thin layer of powder will heat from room temperature to the process temperature in about two seconds. If the powder is preheated to the flow temperature the heating time is substantially less. The power of the DLP is then reduced to maintain the constant process temperature. For the portion of the projected area that is to be fused, the projector is set to full intensity and the time to reach the fusing temperature is about 0.25 seconds. Various embodiments of the present invention use power densities, relative intensity settings, and expose times suited to the particular powder material being used to produce the 3D objects and/or to produce certain properties or features in the 3D objects. Alternative embodiments of the present invention comprise a second radiation source, such as a laser with scanning mirrors as known in the selective laser sintering art. In certain embodiments the radiation source with spatial light modulation is used, not only to pre-heat the powder along the image plane to a process temperature, but to heat the powder within center portions of cross-sectional areas to a fusing temperature while the laser is scanned along the perimeter to fuse the powder defining an outer surface of the 3D object.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

Accordingly, the present invention provides for the production of three-dimensional objects with improved build and support materials. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The specific embodiments and applications thereof described above are for illustrative purposes only and do not preclude modifications and variations encompassed by the scope of the following claims.

What is claimed:

1. A powder-based additive manufacturing system for producing 3D objects from powder material, the system comprising:
   a supply of powder;
   a recoater for applying powder on a powder bed, wherein a top surface of the powder bed defines an image plane;
   a radiation source comprising a light source and a spatial light modulator adapted to simultaneously apply radiation to an entire image plane or to selectively apply radiation to a portion of the entire image plane;
   a temperature measurement device for measuring a temperature of powder at one or more locations of the image plane; and
   a controller configured to:
      preheat the powder in the powder supply to a first temperature below a flow temperature to provide preheated powder in the powder supply;
      after preheating the powder in the powder supply, operate the recoater to apply a layer of the preheated powder upon the powder bed;
      after operating the recoater to apply the layer of the preheated powder, operate the light source and the spatial light modulator to apply radiation to the entire image plane simultaneously to heat the preheated powder along the entire image plane to a process temperature to provide a process temperature powder layer; and
      after operating the light source and the spatial light modulator to apply radiation to the entire image plane simultaneously, operate the light source and the spatial light modulator to selectively apply radiation to portions of the entire image plane but not to the entire image plane and to heat portions of the powder under the entire image plane but not all of the powder under the entire image plane to a fusing temperature;
   wherein the fusing temperature is higher than the process temperature; and the process temperature is higher than the first temperature.

2. A powder-based additive manufacturing system according to claim 1 further comprising at least one of a heated gas supply and a chamber heater for heating the powder to the first temperature.

3. A powder-based additive manufacturing system according to claim 1, wherein the recoater comprises at least one of a roller and a doctor blade.

4. A powder-based additive manufacturing system according to claim 1, wherein the spatial light modulator comprises at least one of a digital light processor (DLP), liquid crystal display (LCD), liquid crystal on silicon (LCOS), and grating light valve (GLV).

5. A powder-based additive manufacturing system according to claim 1, wherein the radiation source applies visible light radiation.

6. A powder-based additive manufacturing system according to claim 1, wherein the radiation source applies IR radiation.

7. A powder-based additive manufacturing system according to claim 1, wherein the controller is further configured to scan a laser to define an outer surface of the cross-sectional areas fused by the radiation source.

8. A powder-based additive manufacturing system according to claim 1, wherein the radiation source is stationary.

9. A powder-based additive manufacturing system according to claim 1, wherein the radiation source comprises at least one of an LED, an LED array, a near IR fiber laser, and a diode laser.

10. A powder-based additive manufacturing system according to claim 1, wherein the supply of powder comprises at least one of the following materials: polyamide (PA), polyaryletherketone (PAEK), polyether ether ketone (PEEK), polyphenylene sulfide (PPS) and polycarbonate (PC).

11. A powder-based additive manufacturing system according to claim 1, wherein the supply of powder comprises at least one of the following materials: carbon black and a pigment or dye defining a non-black color.

12. A powder-based additive manufacturing system for producing 3D objects from powder material, the system comprising:
- a supply of polymeric powder;
- a recoater for applying the polymeric powder on a powder bed, wherein a top surface of the powder bed defines an image plane;
- a radiation source comprising a light source and a spatial light modulator adapted to selectively apply radiation to the image plane;
- a temperature measurement device for measuring a temperature of powder at one or more locations of the image plane and providing powder temperature data to a controller; wherein, the controller is configured to:
- preheat the polymeric powder in the powder supply to a first temperature below a flow temperature to provide preheated polymeric powder in the powder supply;
- operate the recoater to apply a layer of the preheated polymeric powder upon the powder bed;
- operate the light source and the spatial light modulator to heat the preheated powder in the image plane to a process temperature;
- operate the light source and the spatial light modulator to selectively heat portions but not all of the powder in the image plane to a fusing temperature; and
- receive the powder temperature data from the temperature measurement device to operate the light source and spatial light modulator to maintain the powder in the image plane at the process temperature outside of the selectively heated portions, wherein the fusing temperature is higher than the process temperature; and the process temperature is higher than the first temperature.

\* \* \* \* \*